US011072277B2

(12) United States Patent
Campbell

(10) Patent No.: US 11,072,277 B2
(45) Date of Patent: Jul. 27, 2021

(54) METHOD AND APPARATUS TO DYNAMICALLY IDENTIFY A VEHICLE

(71) Applicant: Adway International, Inc., Los Angeles, CA (US)

(72) Inventor: Scott Patrick Campbell, Belmont, CA (US)

(73) Assignee: Adway International Inc., Los Angeles, CA (US)

( * ) Notice: Subject to any disclaimer, the term of this patent is extended or adjusted under 35 U.S.C. 154(b) by 0 days.

(21) Appl. No.: 17/026,161

(22) Filed: Sep. 18, 2020

(65) Prior Publication Data

US 2021/0086689 A1    Mar. 25, 2021

Related U.S. Application Data

(60) Provisional application No. 62/903,683, filed on Sep. 20, 2019.

(51) Int. Cl.
*B60Q 1/50* (2006.01)
*H04W 4/80* (2018.01)
*H04W 4/021* (2018.01)
*H04W 4/02* (2018.01)

(52) U.S. Cl.
CPC ............ *B60Q 1/50* (2013.01); *H04W 4/021* (2013.01); *H04W 4/023* (2013.01); *H04W 4/80* (2018.02); *B60Q 2400/50* (2013.01)

(58) Field of Classification Search
None
See application file for complete search history.

(56) References Cited

U.S. PATENT DOCUMENTS

| | | | |
|---|---|---|---|
| 6,122,850 A | 9/2000 | Strzeletz | |
| 7,175,321 B1 | 2/2007 | Lopez | |
| 8,096,069 B2 | 1/2012 | Ishikawa et al. | |
| 9,178,371 B2 | 11/2015 | Koelsch | |
| 9,321,395 B2 | 4/2016 | Ammar et al. | |
| 9,827,901 B1 | 11/2017 | Thompson et al. | |
| 10,160,380 B1 | 12/2018 | Salter et al. | |
| 10,600,086 B2 | 3/2020 | Krylov | |
| 2010/0039379 A1 | 2/2010 | Hildreth | |
| 2011/0273671 A1 | 11/2011 | Chu | |
| 2013/0006775 A1* | 1/2013 | Jordan | G08G 1/20 705/14.62 |
| 2013/0231828 A1 | 9/2013 | Seal | |
| 2013/0342458 A1 | 12/2013 | Williams et al. | |
| 2014/0188614 A1 | 7/2014 | Badenhop | |
| 2015/0032328 A1 | 1/2015 | Healey et al. | |
| 2016/0167648 A1 | 6/2016 | James et al. | |
| 2017/0200197 A1 | 7/2017 | Brubaker | |
| 2018/0004473 A1 | 1/2018 | Amaru | |

(Continued)

*Primary Examiner* — John F Mortell
(74) *Attorney, Agent, or Firm* — Fenwick & West LLP

(57) ABSTRACT

Embodiments include the use of on-vehicle or in-vehicle dynamically projected or displayed identification data (e.g., names, brand names, pictures, ID codes, bar codes, etc.) that a person outside of the vehicle can see. The projection or display of the identification data can be presented when the vehicle is near the location of the intended passenger (e.g., determined via GPS data, by location of Bluetooth signals or WiFi signals, or other). The identification data may be interpretable by humans and/or can be encoded into patterns that a smartphone app or other electronic device can decode.

14 Claims, 2 Drawing Sheets

(56) References Cited

U.S. PATENT DOCUMENTS

| | | | |
|---|---|---|---|
| 2018/0075754 A1* | 3/2018 | Salter | G06Q 10/02 |
| 2019/0096297 A1* | 3/2019 | Cary | G09G 3/002 |
| 2019/0137290 A1* | 5/2019 | Levy | G01C 21/3461 |
| 2020/0151916 A1* | 5/2020 | Kenney | G01C 21/3438 |

* cited by examiner

METHOD AND APPARATUS TO DYNAMICALLY IDENTIFY A VEHICLE

CROSS-REFERENCE TO RELATED APPLICATION(S)

This application claims priority under 35 U.S.C. § 119(e) to U.S. Provisional Patent Application Ser. No. 62/903,683, "Method and Apparatus to Dynamically Identify a Vehicle," filed Sep. 20, 2019. The subject matter of all of the foregoing is incorporated herein by reference in their entirety.

BACKGROUND

1. Technical Field

This disclosure relates generally to identifying vehicles and, more particularly, to doing so by projecting an identifier onto the vehicle.

2. Description of Related Art

Ridesharing is one situation in which vehicles must be identified to third parties. Using an app, a passenger books a ride on a vehicle that he is not familiar with. The ride vehicle must be correctly identified to the ride passenger so that he rides in the correct vehicle. Currently, this is achieved based on license plates. The app provides to the user the license plate of the ride vehicle and a short description of the vehicle and driver. The user must then match this description to vehicles in his vicinity. This may take some effort and is subject to error, particularly if the pickup point is congested with many ride passengers trying to find their respective ride vehicles.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1:
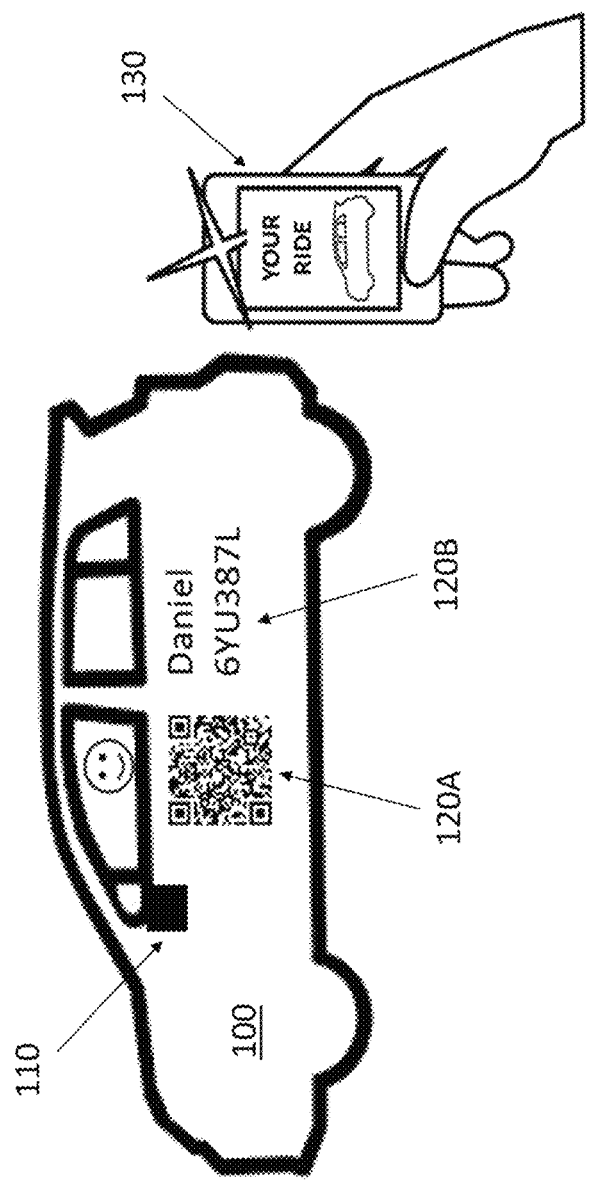
FIG. 1 is an example of one embodiment of projecting an identifier on a vehicle.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In one aspect, a method and apparatus for identifying a ride vehicle to an intended ride passenger is described. Embodiments include the use of on-vehicle or in-vehicle dynamically projected or displayed identification data (e.g., names, brand names, pictures, ID codes, bar codes, etc.) that a person outside of the vehicle can see. The projection or display of the identification data can be presented when the vehicle is near the location of the intended passenger (e.g., determined via GPS data, by location of Bluetooth signals or WiFi signals, or other). For example, geolocation of the vehicle and the intended passenger may be determined based on GPS signals received by the vehicle, by electronic devices operated by the driver of the vehicle and/or electronic devices operated by the intended passenger. Alternatively, reception by the vehicle of Bluetooth, WiFi or other types of short range signals produced by the intended passenger may also indicate physical proximity. The identification data may be interpretable by humans and/or can be encoded into patterns that a smartphone app or other electronic device can decode.

In one aspect, a controller projects dynamic advertisements onto the sides of vehicles while using digital metrics (such as local Bluetooth or WiFi ID numbers and signal strengths, geolocations, etc.) to target those advertisements to people near enough to the vehicle to see the projected advertisements. For example, see U.S. Pat. No. 10,600,086 "System and Method for Projecting and Displaying Images," which is incorporated by reference herein. The targeted, projected (or displayed) advertisements could be temporarily replaced by unique identifiers (bar codes, text, pictures, other) that could be used by the intended passengers in Uber (or other) vehicles to let the intended passengers know that a particular vehicle was their pick-up vehicle. The timing of the temporary unique identifiers could be driven by noting the vehicle's reception of the intended passenger's Bluetooth or WiFi signals in proximity to the vehicle and/or by correlating geolocations of the intended passenger and the vehicle, etc.

Apps on the intended passenger's phone could also be used to read the unique identifiers projected onto the vehicles as a secondary key to unlock greater details about the vehicle and the driver and display that information on the intended passenger's smartphone (the primary key could be provided by the app to the intended passenger's smartphone upon execution of the pick-up agreement). Data could also be displayed to the driver of the pick-up vehicle.

A dynamic projection or display system mounted onto or integrated with a vehicle is used to present a unique identifier onto the vehicle system for public view. This unique identifier can be presented when the vehicle comes into proximity with a digital signal (such as a specific Bluetooth or WiFi identifier) or with a specified geolocation (i.e., via GPS or other). Said digital signals and/or geolocations can be specific to the smartphone, passenger and/or location of an intended passenger for that vehicle. Alternatively, the identifier may be presented based on identifying landmarks, sounds, other visual or audio clues, time of day and/or brightness of ambient light, ambient temperature, vibration levels, speed, acceleration, or other environmental conditions specific to the intended passenger's location.

The unique identifier can be a bar code, words, pictures or other patterns that contain information that the intended passenger for that vehicle or that the smartphone of the intended passenger for that vehicle can read to verify that said vehicle is the correct vehicle for the intended passenger. Other examples can include illumination by lights, text or images on the vehicle, sounds from vehicle, vehicle actions (i.e., auto-park into specified parking space), activation of signs separate from vehicle (i.e., activation of information on or illumination of nearby billboards, monitors, announcement services for audio, signaling to representatives such as concierges, etc.).

The unique identifier can also be a trigger in a smartphone or tablet app that runs an augmented reality, mixed reality, virtual reality or other reality program to overlay unique identifiers on the smartphone's or tablet's video capture image while the intended passenger scans a zone in which the vehicle may be (e.g., the intended vehicle in the displayed smartphone's or tablet's screen becomes highlighted or starts flashing, and additional information regarding the vehicle, driver, trip, etc., is then also displayed onto the screen as an overlay on the captured images).

If the intended passenger's smartphone reads the unique identifier (e.g., bar code or other encoded pattern), then said smartphone can run an app that shares a distributed key (part of the key in the projected or displayed unique identifier on the vehicle and the other part of the key as-received by the intended passenger's smartphone upon agreement to connect with a specific vehicle) that then unlocks additional details (i.e., regarding the vehicle, the driver, etc.) that can be displayed on the intended passenger's smartphone (and on the vehicle driver's device). This additional data can either be presented on the intended passenger's smartphone as an augmented reality overlay (i.e., highlighting the vehicle and/or confirming the connection with words, etc.) or as a new window on the smartphone's display (i.e., with any manner of "proper connection" identifiers) or as an alarm. Such a dynamic, targeted verification process will enhance the safety of the intended passenger, the driver, and will save Uber (or other) money by eliminating disputes over whether or not an intended passenger was picked up by their intended vehicle, etc. As soon as the intended passenger enters the vehicle, the projected or displayed unique identifier can be replaced by the normal advertisement campaign data.

See FIG. 1 for a visual description of one embodiment. In FIG. 1, the user has booked a ride using a ridesharing app on his smartphone 130. The app identifies the vehicle to the intended passenger as license plate 6YU387L with driver Daniel. The driver operates the counterpart app on his smartphone. The vehicle also has a projector 110 mounted on the side view mirror, with a controller in the vehicle. When the driver's app determines that the vehicle 100 is in the vicinity of the intended passenger, the controller causes the projector 110 to project a bar code 120A and also the driver's name and the vehicle's license plate 120B on the side of the vehicle. The intended passenger sees the name and license plate 120B and can identify the vehicle that way. The smartphone reads the bar code 120A and overlays "Your Ride" accompanied by an audio tone on the smartphone's view of the environment, thus identifying the vehicle in yet another way.

Alternate embodiments can also have the smartphone's app sound an alarm if the intended passenger gets in the wrong vehicle and/or an alarm can sound in the intended vehicle if the wrong passenger gets in the intended vehicle (i.e., someone who randomly walks up and gets in the vehicle). If the correct passenger gets in the correct vehicle, then the app can verify correctness to both the passenger and the vehicle's driver while also digitally verifying that the correct passenger is in the correct vehicle for billing purposes. This concept can be extended to the tracking of cargo being loaded or unloaded to or from a vehicle.

FIG. 1 is an example of one embodiment of the invention. A ride vehicle with a projection (or display) that presents a unique identifier (digital and/or linguistic) to indicate to an intended passenger that this vehicle is their ride (can be verified via a Ride app running on the intended passenger's phone). Unique identifier is displayed when the ride vehicle is close to the intended passenger (via Bluetooth, WiFi, GPS or other indicators). Verbiage, alarms and/or use of augmented reality on the intended passenger's phone can alert them.

Figure 2:
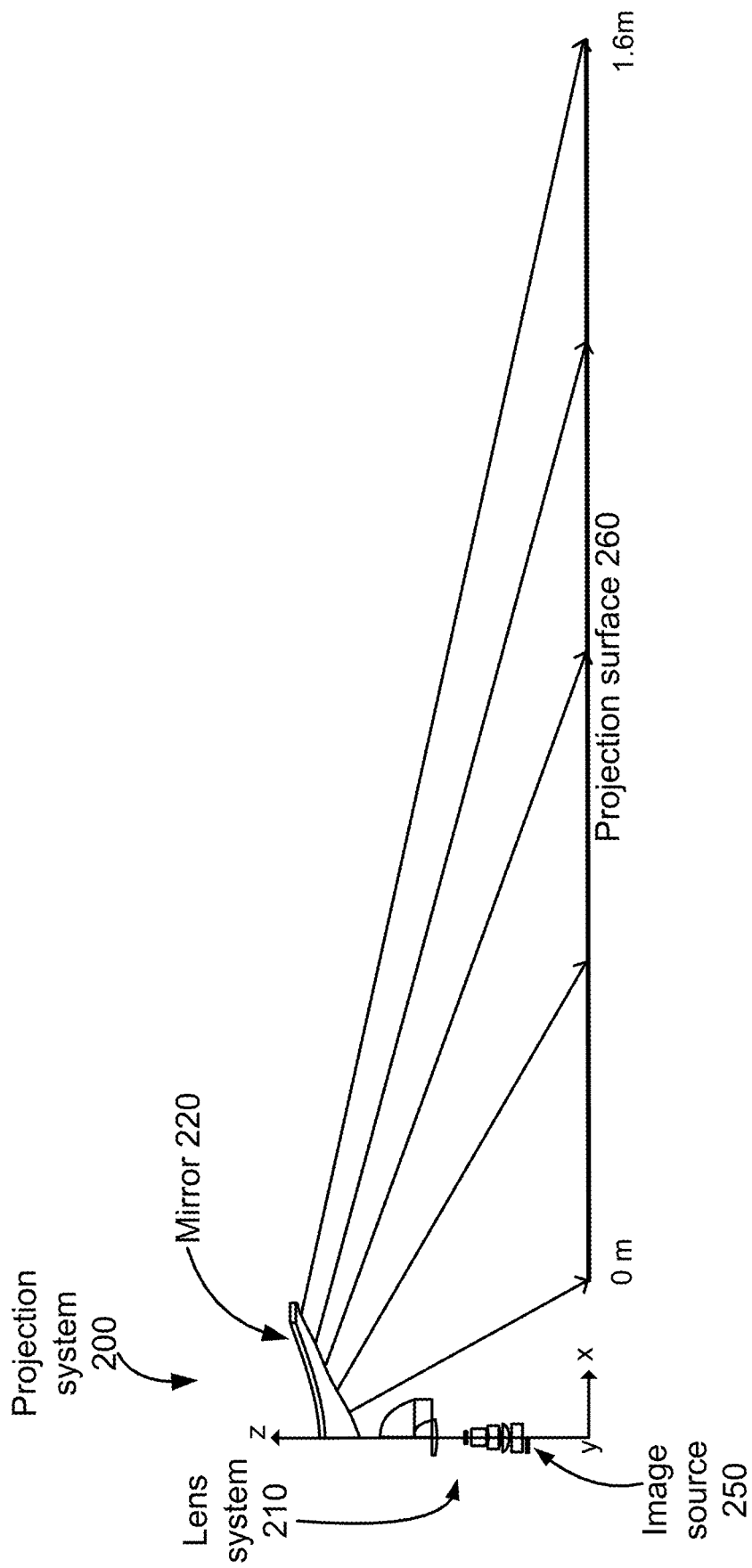
FIG. 2 shows an example projection system.

FIG. 2 shows an example design for such a projector. The off-axis image projection system 200 contains a projection lens system 210 with multiple lenses and also contains a free-form mirror 220. In this example, the lens system 210 contains spherical and aspherical lenses. The projection system 210 projects light from an image source 250 onto a surface 260 (i.e., the side of the car). The projection surface 260 is both close to the projector (in z) and extends away from the projector (in x and y).

The coordinate system is defined as follows. The optical axis of the lens system 210 defines the z-axis. The projection surface 260 may be non-planar (e.g., a car door), but it extends primarily perpendicularly to the z-axis. The long direction of the projection surface 260 defines the x-axis and the other direction defines the y-axis. For example, if the projection surface is approximately rectangular, then the long edge of the rectangle defines the x-axis and the short edge defines the y-axis.

The image source 250 is offset in one direction along the x-axis (along the −x direction in FIG. 2), and the mirror 220 and the projection surface 260 are offset in an opposite direction along the x-axis (+x direction in FIG. 2). In some designs, all of the image-forming rays from the image source 250 originate from one side of the y-z plane (i.e., from the −x side). They cross the y-z plane and then reflect off the mirror 220 to the projection surface 260, so that the footprint of the image-forming rays on the mirror 220 is entirely on the +x side of the y-z plane, as is the image on the projection surface 260. The image source 250 and projection surface 260 may also be offset in opposite directions with respect to the y-axis.

Table 1 shows the optical prescription data for the projection lens system 210 and free-form mirror 220.

TABLE 1

Optical prescription for projection lens system and free-form mirror

| Surf | Type | Radius | Thickness | Glass | Clear Diam | Conic | Comment |
|---|---|---|---|---|---|---|---|
| OBJ | STANDARD | Infinity | 2 | | 23.7914 | 0 | |
| 1 | STANDARD | Infinity | 16 | N-BK7 | 24.05121 | 0 | |
| 2 | STANDARD | Infinity | 1 | | 25.41835 | 0 | |
| 3 | EVENASPH | 30.7477 | 7.729093 | N-BK7 | 26.36603 | 0.592258 | |
| 4 | EVENASPH | −110.5697 | 0.1999897 | | 25.11846 | −0.1146298 | |
| 5 | EVENASPH | 11.85581 | 10.75435 | N-BK7 | 22.22264 | −1.911712 | |
| 6 | EVENASPH | 10.70796 | 1.828717 | | 16.10539 | 0.09267831 | |
| 7 | STANDARD | 34.08811 | 19.70441 | N-BK7 | 16.05821 | 0 | |
| 8 | STANDARD | −22.02326 | 0.5 | | 10.88147 | 0 | |
| STO | STANDARD | Infinity | 0.5 | | 10 | 0 | |
| 10 | STANDARD | 60.79569 | 1.920591 | N-BK7 | 10.63152 | 0 | |
| 11 | STANDARD | −185.1722 | 24.444 | | 11.38172 | 0 | |
| 12 | STANDARD | 61.73002 | 1.882993 | N-BK7 | 29.81786 | 0 | |

TABLE 1-continued

Optical prescription for projection lens system and free-form mirror

| Surf | Type | Radius | Thickness | Glass | Clear Diam | Conic | Comment |
|---|---|---|---|---|---|---|---|
| 13 | STANDARD | 33.0401 | 13.47229 | | 30.79236 | 0 | |
| 14 | EVENASPH | −39.73633 | 30 | N-BK7 | 31.04567 | 0.01438556 | |
| 15 | EVENASPH | −29.1315 | 20 | | 61.35416 | −2.005868 | |
| 16 | SZERNSAG | 8.601869 | −203.2 | MIRROR | 184.0047 | −3.124734 | mirror |
| IMA | STANDARD | Infinity | | | 3828.892 | 0 | |

More details may be found in PCT application number PCT/US20/51675 and U.S. provisional application No. 62/903,687, which are incorporated by reference herein.

While the examples given pertain primarily to vehicles and ridesharing services, the technologies described may also be applied to other vehicles and to other applications. For example, information may be displayed on emergency vehicles (police, fire, ambulance, etc.). Examples of the information include station number, neighborhood watch campaign messaging, special event vehicle ID (e.g., for a parade, political visitor, etc.), name of on-site commander (e.g., when multiple stations' fire, police, ambulance work together on a larger-scale emergency), etc. In another example application, restaurant promotional information may be displayed upon pick-up and during delivery, based on the restaurant's request.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

What is claimed is:

1. A system for identifying a vehicle to an intended passenger, comprising:
    a projector attachable to a vehicle and positioned to project an image on a side of the vehicle; and
    a controller coupled to the projector, the controller causing the projector to project an identifier on the side of the vehicle when the vehicle is in a vicinity of an intended passenger, wherein the identifier identifies the vehicle to the intended passenger; the identifier is readable by an electronic device operated by the intended passenger and the electronic device reading the identifier causes the electronic device to take further actions.

2. The system of claim 1 wherein the controller determines that the vehicle is in the vicinity of the intended passenger based on geolocation data of the vehicle and of the intended passenger.

3. The system of claim 2 wherein the geolocation data is determined based on GPS signals received by the vehicle or by an electronic device operated by a driver of the vehicle.

4. The system of claim 2 wherein the geolocation data is determined based on GPS signals received by an electronic device operated by the intended passenger.

5. The system of claim 1 wherein the controller determines that the vehicle is in the vicinity of the intended passenger based on reception of a signal specific to the intended passenger or to an electronic device operated by the intended passenger.

6. The system of claim 5 wherein the signal produced by the electronic device operated by the intended passenger comprises a Bluetooth signal or a WiFi signal.

7. The system of claim 1 wherein the controller determines that the vehicle is in the vicinity of the intended passenger based on reception of a signal specific to a location of the intended passenger.

8. The system of claim 1 wherein the controller determines that the vehicle is in the vicinity of the intended passenger based on sensing environmental conditions that are specific to a location of the intended passenger.

9. The system of claim 1 wherein the identifier is understandable by the intended passenger.

10. A system for identifying a vehicle to an intended passenger, comprising:
    a projector attachable to a vehicle and positioned to project an image on a side of the vehicle; and a controller coupled to the projector, the controller causing the projector to project an identifier on the side of the vehicle when the vehicle is in a vicinity of an intended passenger, wherein the identifier identifies the vehicle to the intended passenger and wherein the identifier acts as a secondary key to allow the electronic device access to additional information about the vehicle and/or driver, and wherein the electronic device reading the identifier causes the electronic device to access the additional information and to display the additional information to the intended passenger.

11. The system of claim 1 wherein the electronic device reading the identifier causes the electronic device to highlight the vehicle in an image of the intended passenger's environment.

12. A system for identifying a vehicle to an intended passenger, comprising:
 a projector attachable to a vehicle and positioned to project an image on a side of the vehicle; and
 a controller coupled to the projector, the controller causing the projector to project an identifier on the side of the vehicle when the vehicle is in a vicinity of an intended passenger, wherein the identifier identifies the vehicle to the intended passenger and wherein the electronic device reading the identifier causes additional information to be provided to the driver of the vehicle.

13. The system of claim 1 wherein the controller also causes the projector to project other images on the side of the vehicle; but, when the vehicle is in the vicinity of the intended passenger, the controller supersedes the other images with the identifier.

14. The system of claim 1 wherein the identifier is one part of a distributed key, and the further action comprises the electronic device using the distributed key to access additional information about the vehicle and/or driver and displaying the additional information to the intended passenger.

* * * * *